US007988062B2

(12) United States Patent
Nonaka et al.

(10) Patent No.: US 7,988,062 B2
(45) Date of Patent: Aug. 2, 2011

(54) TEMPERATURE CONTROL DEVICE FOR TARGET SUBSTRATE, TEMPERATURE CONTROL METHOD AND PLASMA PROCESSING APPARATUS INCLUDING SAME

(75) Inventors: Ryo Nonaka, Nirasaki (JP); Koichi Murakami, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 430 days.

(21) Appl. No.: 12/261,341

(22) Filed: Oct. 30, 2008

(65) Prior Publication Data

US 2009/0118872 A1 May 7, 2009

Related U.S. Application Data

(60) Provisional application No. 61/024,336, filed on Jan. 29, 2008.

(30) Foreign Application Priority Data

Nov. 2, 2007 (JP) ................................. 2007-285823

(51) Int. Cl.
*G05D 23/00* (2006.01)
*H01L 21/306* (2006.01)

(52) U.S. Cl. ......... 236/1 C; 62/179; 62/259.2; 361/699; 165/104.33; 156/345.53

(58) Field of Classification Search .................. 236/1 C; 62/259.2, 179, 180; 361/689, 699, 701; 165/104.33; 156/345.53; 438/745
See application file for complete search history.

(56) References Cited

U.S. PATENT DOCUMENTS

| 5,974,816 | A  | * | 11/1999 | Endo .............................. 62/179 |
| 6,634,177 | B2 | * | 10/2003 | Lin et al. ......................... 62/3.2 |
| 6,986,261 | B2 | * | 1/2006  | Sasaki et al. .................... 62/201 |
| 7,000,416 | B2 | * | 2/2006  | Hirooka et al. ............... 62/259.2 |
| 2008/0271471 | A1 | * | 11/2008 | Nozawa et al. ................. 62/179 |

FOREIGN PATENT DOCUMENTS

| JP | 7-271452   | 10/1995 |
| JP | 2001-134324 | 5/2001 |

* cited by examiner

*Primary Examiner* — Marc E Norman
(74) *Attorney, Agent, or Firm* — Oblon, Spivak, McClelland, Maier & Neustadt, L.L.P.

(57) ABSTRACT

A temperature control device for a target substrate includes a mounting table having temperature control members respectively provided in temperature systems to control temperatures of regions of the target substrate to respective predetermined temperature levels; circulation channels through which fluids passing through the temperature control members flow; and heating channels each for flowing therein a heated fluid having a higher temperature compared to the fluids circulating in the circulation channels. The device further includes cooling channels each for flowing therein a cooled fluid having a lower temperature compared to the fluids circulating in the circulation channels; and joining units that join the circulation channels to build the respective temperature control systems, the joining units having flow rate control units that controls flow rate ratios of the fluids supplied from the respective channels to the temperature control members.

12 Claims, 6 Drawing Sheets

TEMPERATURE CONTROL DEVICE FOR TARGET SUBSTRATE, TEMPERATURE CONTROL METHOD AND PLASMA PROCESSING APPARATUS INCLUDING SAME

FIELD OF THE INVENTION

The present invention relates to a device for controlling a temperature of a semiconductor wafer serving as a substrate; and, more particularly, to a temperature control device for a target substrate which has temperature control members capable of independently controlling respective temperatures of a plurality of regions of a mounting table for mounting thereon the target substrate, a temperature control method and a plasma processing apparatus including same.

BACKGROUND OF THE INVENTION

In a plasma processing apparatus for performing plasma etching or the like on a target substrate, the processing is often performed while a temperature of the substrate being changed stepwise. FIG. 6 is a chart diagram showing a stepwise temperature control in performing processing in a same processing chamber while etching conditions (gas types, temperatures, pressures and the like) being changed. In order to perform the stepwise temperature control, the temperature needs to be controlled at a high speed. For example, the time required for each step should be less than about 30 seconds. During the temperature control, the substrate temperature is increased or decreased compared to the previous step. In any cases, it is required to shorten a period of time for increasing or decreasing the substrate temperature.

Conventionally, the substrate temperature is changed by heating and cooling a susceptor which mounts thereon a substrate and functions as a heat exchanger plate. The susceptor is cooled by circulating a coolant therein, and is heated by a heater, e.g., a thermoelectric element module or the like, provided directly under the substrate. In other words, it is often the case that the susceptor is heated and cooled by separate units.

Meanwhile, in the plasma processing apparatus, a high frequency power for plasma generation is applied and it is required to prevent an RF (radio frequency) from leaking from wire lines of the thermoelectric module (heater). To do so, an RF filter needs to be provided at a wiring system of the heater. However, this makes the equipment complicated and increases the cost, which is not desirable. Further, even if the RF filter is added, it is not possible to completely suppress RF noise and RF power loss. Furthermore, the filter needs to be changed depending on the RF frequency and the RF power. Besides, although ceramic is generally used as a heat source of a heater, ceramic can be damaged by rapid thermal contraction. For that reason, the rapid temperature increase by the heater is limited.

The following Patent Documents describe techniques in which the susceptor (heat exchanger plate) is cooled and heated by heat exchange of a heat transfer medium (e.g., cooling water and heating water) (Patent Documents 1 and 2). That is, the temperature of the susceptor can be arbitrarily changed by providing, instead of a heater, a cooling circulation circuit and a heating circulation circuit of the heat transfer medium and controlling the flow rates or the mixing ratio of the heat transfer medium supplied from both circuits to the susceptor.

[Patent Document 1] Japanese Patent Laid-open Publication No. 2001-134324
[Patent Document 2] Japanese Patent Laid-open Publication No. H7-271452
[Patent Document 3] Japanese Patent Laid-open Publication No. 2006-156938

In the above-described method for heating and cooling the susceptor by circulating the heat transfer medium therein, the entire susceptor has the same temperature and, thus, the thermal conductivity between the substrate and the susceptor cannot vary depending on portions of the substrate.

Further, as a diameter of a semiconductor substrate (wafer) increases, variation occurs between heat input and heat output depending on portions of the wafer. Thus, it is difficult to maintain the entire surface of the scaled-up wafer at a uniform temperature.

For example, in the plasma processing apparatus, variation often occurs in the density distribution of the plasma or the temperature distribution of the coolant circulating in the susceptor. Especially, it is difficult to keep the density distribution of the plasma uniform over the entire wafer, so that the balance of heat input and heat output often varies between a peripheral portion and a central portion of the wafer.

In general, the central portion of the wafer is easily cooled, whereas the cooling of the peripheral portion of the wafer is retarded. Therefore, the cooling rate in the central portion of the wafer should be differentiated from that in the peripheral portion of the wafer in such a way that the entire wafer can be maintained at a uniform temperature.

In order to differentiate the cooling rates over the wafer portions, there is suggested a method in which the mounting table is divided into a plurality of zones and the amount of cooling gas supplied to the gap between the substrate and the mounting table varies depending on the zones (Patent Document 3).

However, this method is disadvantageous in that the substrate cannot be heated with this method, and also in that the temperature characteristics of the substrate change at the boundaries of the zones. To that end, there arises a need to provide a susceptor capable of varying the cooling rate or the heating rate depending on the wafer portions.

SUMMARY OF THE INVENTION

In view of the above, the present invention provides a temperature control device for a target substrate which can independently control temperatures of a plurality of regions of the target substrate by heating or cooling the target substrate by circulating fluid in a temperature control unit of a mounting table for mounting thereon the target substrate, a temperature control method and a plasma processing apparatus including same.

In accordance with one aspect of the invention, there is provided a temperature control device for a target substrate.

The device includes a mounting table having temperature control members respectively provided temperature control systems to control temperatures of regions of the target substrate to respective predetermined temperature levels; circulation channels, respectively provided in the temperature control systems, through which fluids passing through the temperature control members flow; heating channels each for flowing therein a heated fluid having a higher temperature compared to the fluids circulating in the circulation channels; and cooling channels each for flowing therein a cooled fluid having a lower temperature compared to the fluids circulating in the circulation channels.

The device further includes joining units that join the circulation channels, the heating channels and the cooling channels near the mounting table, to build the respective temperature control systems, the joining units having flow rate control units that control flow rate ratios of the fluids supplied from the respective channels to the temperature control members.

In accordance with the above configuration, the heat discharge rate or the thermal emission to the substrate can be randomly controlled by circulating fluid of different temperatures in the temperature control units depending on the regions. For example, when the substrate temperature is not uniform due to variation in balance between heat input and heat output depending on portions of the substrate, it is possible to obtain a uniform substrate temperature by enhancing cooling of a region where a temperature of the substrate is high and weakening cooling of a region where a temperature of the substrate is low.

Each temperature system may have a pump for sucking a fluid of a downstream side of each temperature control member and discharging the sucked fluid to its corresponding circulation channel, heating channel and cooling channel.

The flow rate control units preferably feedback-control temperatures detected by the temperature detection units, which detect temperatures of fluids flowing from the joining units to the temperature control members, to obtain the predetermined temperature levels.

In accordance with another aspect of the invention, there is provided a temperature control device for a target substrate.

The device includes a mounting table having temperature control members respectively provided in temperature control systems to control temperatures of regions of the target substrate to respective predetermined temperature levels; circulation channels, respectively provided in the temperature control systems, through which fluids passing through the temperature control members flow; heating channels each for flowing a heated fluid having a higher temperature compared to the fluids flowing in the circulation channels; cooling channels each for flowing a cooled fluid having a lower temperature compared to the fluids flowing in the circulation channels; first joining units that join the circulation channels, the heating channels and the cooling channels near the mounting table, to build the respective temperature control systems, the first joining units having flow rate control units that control flow rate ratios of the fluids supplied from the respective channels to the temperature control members; and a second joining unit, provided at a downstream side of the temperature control members, for joining the fluids provided from the temperature control members.

The device further includes a pump for sucking the joined fluids from the second joining unit and discharging the sucked fluid to the circulation channels, the heating channels and the cooling channels.

With the above configuration, it is possible to reduce the number of pumps and simplify the line structure of the circulation channel.

The second joining unit and the pump may be formed as a single unit with the pump. The flow rate control units preferably feedback-control temperatures detected by temperature detection units, which detect temperatures of the fluids flowing from the first joining units to the temperature control members, to obtain the predetermined temperature level In accordance with still another aspect of the invention, there is provided a temperature control method for controlling temperatures of regions of a target substrate mounted on a mounting table to predetermined temperature levels.

The method including providing in the mounting table temperature control members for controlling the temperatures of the regions of the target substrate, the temperature control members being provided for respective temperature systems; calculating a difference between a temperature of a fluid flowing in each temperature control member and a target temperature thereof; and on a temperature system basis, joining, before the fluid flows to the each temperature control member, the fluid flowing each temperature control member and one or both of a heated fluid a cooled fluid and controlling a flow rate ratio between the fluid and the heated fluid and/or the cooled fluid.

The method further includes controlling the temperature of the fluid flowing in each temperature control members, wherein the fluids are joined and then inputted into a corresponding temperature control members and the heated and the cooled fluid have a higher and a lower temperature that then outputted fluids.

The flow rate ratio is preferably controlled by performing feedback-control to make a detected temperature of the fluid flowing into the corresponding temperature control members equal to a target temperature.

The present invention includes a plasma processing apparatus having the temperature control device described above.

In accordance with the aspects of the present invention, when the target substrate is heated or cooled, it is possible to control temperatures of a plurality of regions of the target substrate independently by circulating fluid in the temperature control unit of the mounting table for mounting thereon the target substrate. Further, in accordance with the present invention, the substrate temperature can be controlled simply by adjusting the flow rate ratio between the circulation fluid and the heating fluid or that between the circulation fluid and the cooling fluid. Moreover, the fluid temperature can be changed stepwisely, so that it is possible to shorten time required for controlling the substrate temperature.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Figure 1:
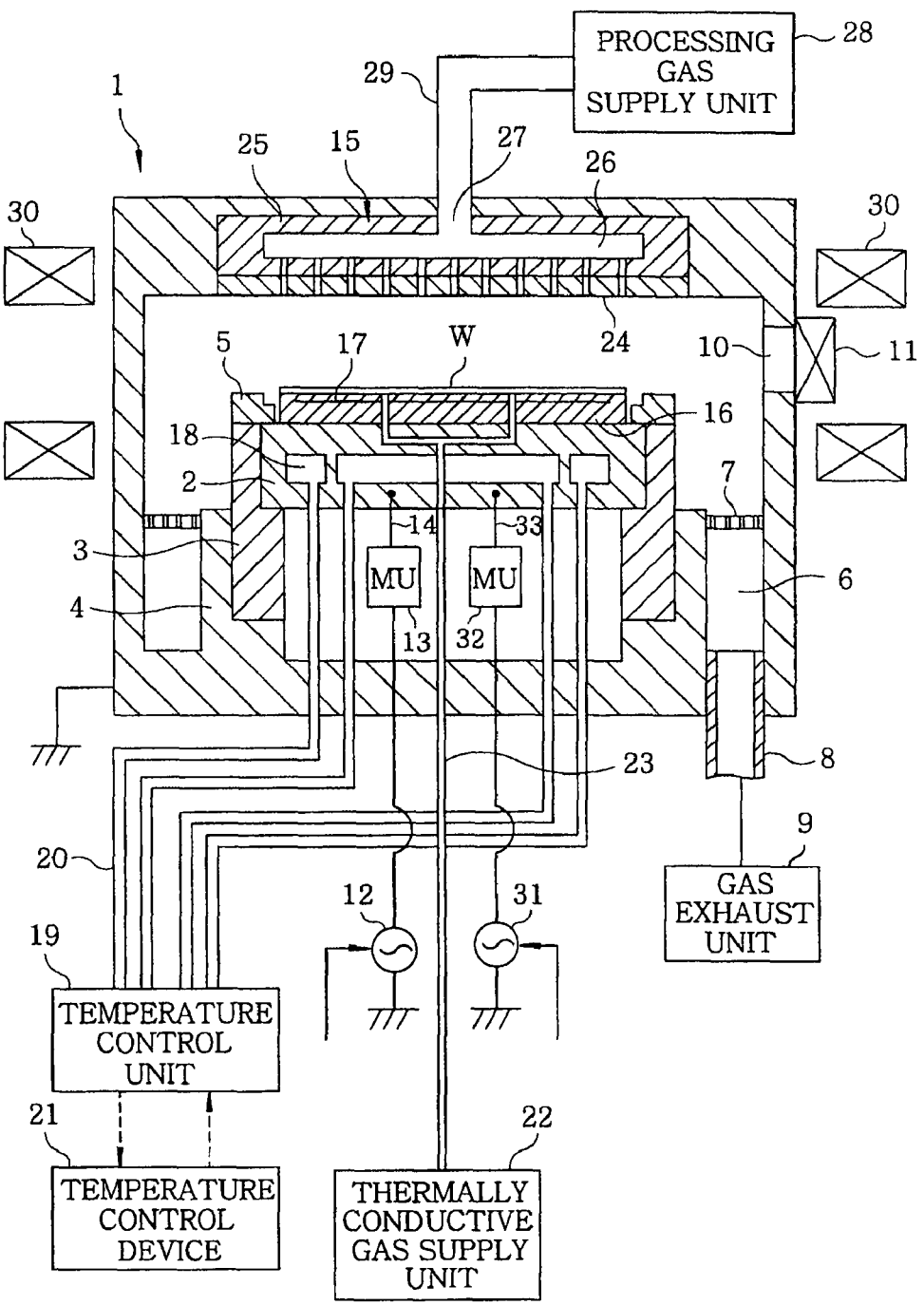
FIG. 1 schematically shows a configuration of a plasma processing apparatus in accordance with an embodiment of the present invention.

The embodiments of the present invention will be described with reference to the accompanying drawings which form a part hereof. FIG. 1 schematically shows an entire configuration of a plasma processing apparatus (plasma etching apparatus) used for implementing the present invention. A chamber 1 shown in FIG. 1 is made of, e.g., aluminum, stainless steel or the like, and is formed in a cylindrical shape whose inner space can be airtightly sealed. The chamber 1 is grounded to the earth.

Provided in the chamber 1 is a mounting table (hereinafter, referred to as a "susceptor") 2 for mounting thereon a substrate to be processed, e.g., a semiconductor wafer W. A susceptor 2 illustrated in FIG. 1 performs heat exchange while being in contact with the semiconductor wafer W and serves as a heat exchanger plate for controlling a temperature of the semiconductor wafer W. The susceptor 2 is made of a material of high conductivity and high thermal conductivity such as aluminum or the like, and serves as a lower electrode.

The susceptor 2 is supported by an insulating cylindrical holder 3 made of ceramic or the like. The cylindrical holder 3 is supported by a cylindrical support 4 of the chamber 1. A focus ring 5 made of quartz or the like is disposed on a top surface of the cylindrical holder 3 to surround a top surface of the susceptor 2 in an annular shape.

An annular gas exhaust channel 6 is formed between a sidewall of the chamber 1 and the cylindrical support 4. An annular baffle plate 7 is attached at the entrance or in the middle of the gas exhaust channel 6. A bottom portion of the gas exhaust channel 6 is connected to a gas exhaust unit 9 via a gas exhaust line 8. The gas exhaust unit 9 has a vacuum pump, so that an inner space of the chamber 1 is depressurized to a predetermined vacuum level. Attached to the sidewall of the chamber 1 is a gate valve 11 for opening and closing a loading/unloading port 10 of the semiconductor wafer W.

A high frequency power supply 12 for plasma generation is electrically connected to the susceptor 2 via a matching unit 13 and a power feed rod 14. The high frequency power supply 12 supplies a high frequency power of a high frequency, e.g., about 40 MHz, to the susceptor 2 serving as the lower electrode. A shower head 15 serving as an upper electrode is provided on a ceiling portion of the chamber 1. A plasma is generated between the susceptor 2 and the shower head 15 by the high frequency power supplied from the high frequency power supply 12.

Further, a bias high frequency power supply 31 for attracting ions in the plasma to the semiconductor wafer W is connected to the susceptor 2 via a matching unit 32 and a power feed rod 33. The high frequency power supply 31 supplies a high frequency power of a lower frequency of, e.g., about 12.88 MHz, about 3.2 MHz or the like, to the susceptor 2.

An electrostatic chuck 16 made of a dielectric material such as ceramic or the like is provided on the top surface of the susceptor 2 in order to attract and hold the semiconductor wafer W with an electrostatic adsorptive force. An internal electrode 17 formed of a conductive film made of a conductor, e.g., copper, tungsten or the like, is buried in the electrostatic chuck 16. A DC power supply (not shown) of a high voltage, e.g., about 2500 V, about 3000 V or the like, is electrically connected to the internal electrode 17. When the DC voltage is applied from the DC power supply to the internal electrode 17, the semiconductor wafer W is adsorptively held on the electrostatic chuck 16 by Coulomb force or Johnson-Rahbek force.

Heat transfer medium (fluid) channels (temperature control members) 18 are formed in the susceptor 2. A predetermined heat transfer medium, e.g., heating water or cooling water, is supplied from a temperature control unit 19 into the heat transfer medium channel 18 through lines 20 to be circulated therein. A temperature of the heat transfer medium supplied from the temperature control unit 19 to the susceptor 2 is controlled to be kept at a predetermined temperature by a temperature control device 21.

A thermally conductive gas from a thermally conductive gas supply unit 22, e.g. He gas, is supplied to a space between the electrostatic chuck 16 and a backside of the semiconductor wafer W via a gas supply line 23 for facilitating heat conductivity between the susceptor 2 and the semiconductor wafer W.

The shower head 15 provided on the ceiling portion includes an electrode plate 24 having on a bottom surface thereof a plurality of gas ventholes and an electrode support 25 for detachably supporting the electrode plate 24. The electrode support 25 has therein a buffer chamber 26, and a gas inlet line 29 extended from a processing gas supply unit 28 is connected to a gas inlet opening 27 of the buffer chamber 26.

The shower head 15 and the susceptor 2 are installed to face each other in parallel, and serve as a pair of electrodes, i.e., the upper and the lower electrode. In the space between the shower head 15 and the susceptor 2 on which the semiconductor wafer W is mounted, a high frequency electric field is vertically formed by the high frequency power, and a high-density plasma is generated near the surface of the semiconductor wafer W by high frequency discharge. Moreover, an annular magnet 30 is disposed around the chamber 1 to be concentric with the chamber 1, thereby forming a magnetic field in a processing space between the shower head 15 and the susceptor 2.

Figure 2A:
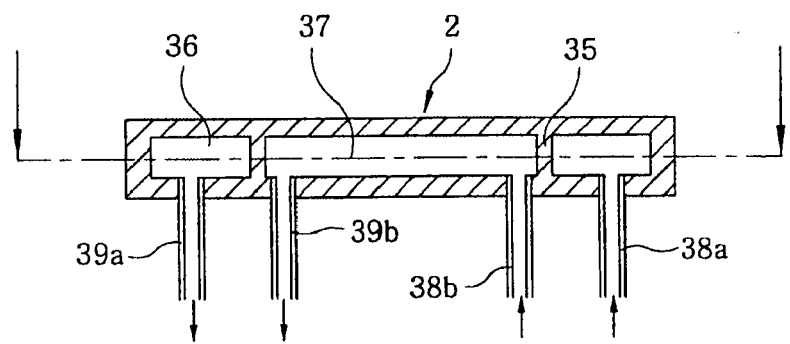
FIGS. 2A and 2B describe an example of a structure of a heat exchanger plate.
Figure 2B:
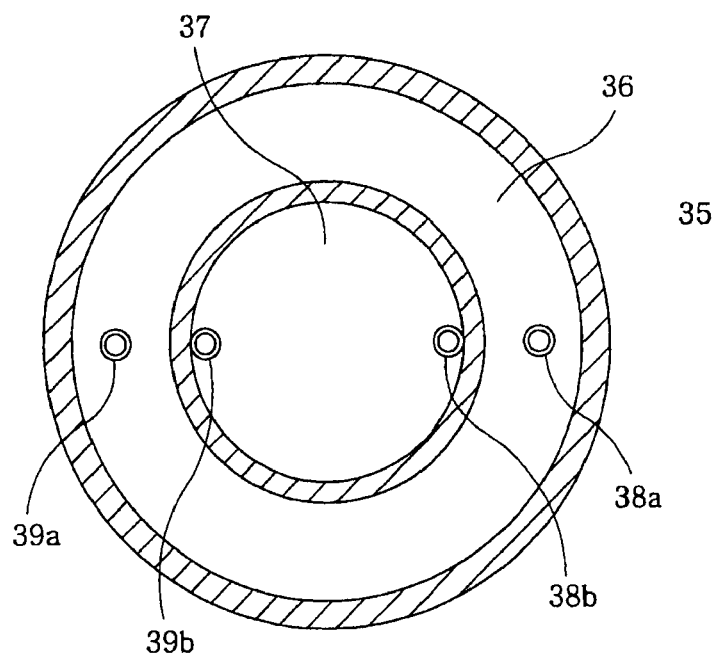

FIGS. 2A and 2B show an example of a structure of a heat exchanger plate (susceptor) 2. The susceptor 2 is formed in a circular plate shape having an inner cavity, and is made of a material with high conductivity, e.g., a metal such as aluminum or the like. The inner cavity is used as a channel of fluid (hereinafter, referred to as a "heat transfer medium"), and is divided, in the example of FIGS. 2A and 2B, into an annular outer channel 36 and a circular plate-shaped inner channel 37 by a partition wall 35 concentrically formed in the susceptor 2.

Both channels are supplied with the heat transfer medium of separate systems. That is, the heat transfer medium for the outer channel 36 is introduced from an inlet port 38a and discharged through an outlet port 39a to be circulated through the outer channel 36 while the temperature of the heat transfer is controlled by the temperature control unit shown in FIG. 1. In the same manner, the heat transfer medium for the inner channel 37 is introduced from an inlet port 38b and discharged through an outlet port 39b to be circulated through the inner channel 37 while the temperature of the heat transfer medium is controlled by the temperature control unit.

The present invention is characterized in that the inside of the susceptor 2 is divided into a plurality of regions and each region is supplied with the heat transfer medium maintained at an independently controlled temperature. Accordingly, the temperature of the heat transfer medium can vary depending on the regions, and the heat transfer amount between the susceptor 2 and the semiconductor wafer W can also vary depending on the regions.

In the example of FIGS. 2A and 2B, the cooling rate in the peripheral portion of the semiconductor wafer W can be differentiated from that in the central portion of the semiconductor wafer W by changing the temperatures of the heat transfer media for the inner channel 37 and the outer channel 36. Conventionally, the temperature of the semiconductor wafer W increases faster in the peripheral portion than in the central portion. Therefore, the temperature of the entire semiconductor wafer W being processed can be uniformly maintained by decreasing the temperature of the heat transfer medium of the outer channel 36 than that of the heat transfer medium of the inner channel 37.

In this embodiment, the outer channel 36 and the inner channel 37 have no obstacle therein. However, they may be zigzag-shaped channels, or channels bent by obstacles such as a collision plate and the like. By employing such channel structures, the generation of sediment can be prevented and, thus, the entire regions can reach a uniform temperature rapidly. Moreover, each channel may have two or more inlet ports and outlet ports.

Besides, in the present invention, the susceptor 2 is not necessarily divided concentrically as in the example of FIGS. 2A and 2B. Further, the susceptor 2 is not necessarily divided into two parts, and may be divided into three or more parts. When it is divided into three or more parts, it is preferable to provide a same number of the circulation systems of the temperature control unit 19 as that of divided regions. The number of the divided regions can be properly selected depending on the characteristics of the plasma processing apparatus or the purposes of temperature control.

Figure 3A:
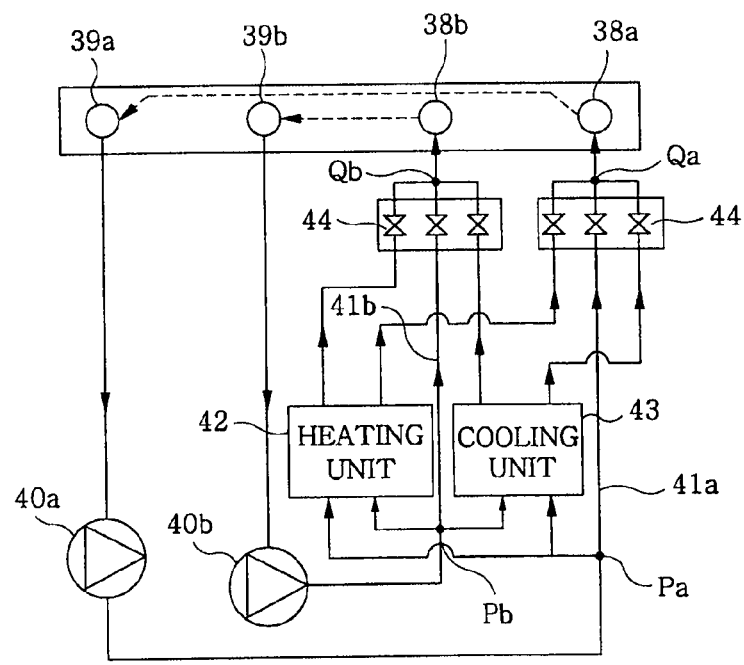
FIGS. 3A and 3B illustrate configuration examples of a circulation channel of a heat transfer medium in a temperature control unit.
Figure 3B:
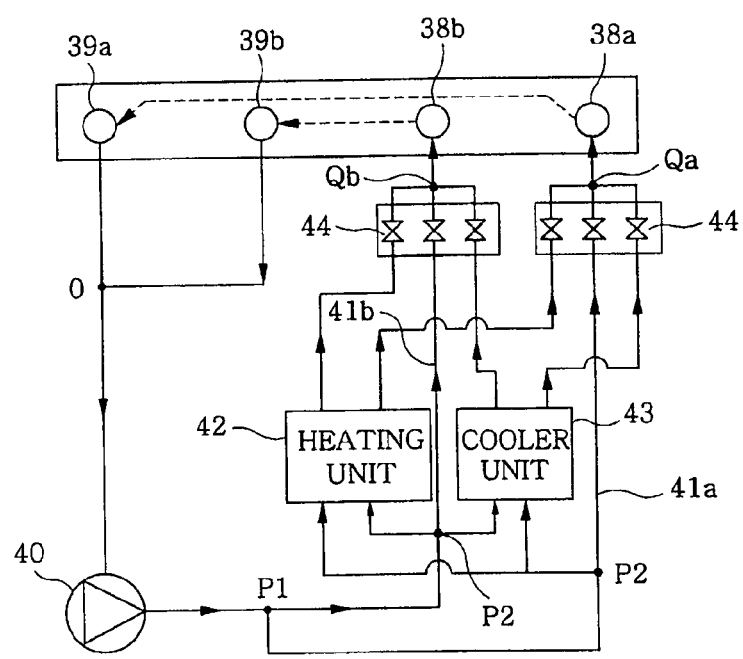

FIGS. 3A and 3B present a configuration diagram showing dual circulation channels of heat transfer medium in the temperature control unit. FIG. 3A is a configuration diagram showing a configuration of a split circulation type in which the respective heat transfer media of dual system are circulated independently, and FIG. 3B is a configuration diagram showing a configuration of a collective circulation type in which the respective heat transfer media of dual system are combined to be circulated.

Referring to FIG. 3A, there are illustrated two pumps 40a and 40b. The heat transfer medium discharged from the outer outlet port 39a is boosted by the pump 40a, and is divided at a branch point Pa into three directions including a bypass channel 41a, a heating unit 42 and a cooling unit 43. Meanwhile, the heat transfer medium discharged from the inner outlet port 39b is boosted by the pump 40b, and is divided at a branch point Pb into a bypass line 41b, the heating unit 42 and the cooling unit 43.

The heating unit 42 can maintain the heat transfer medium at a predetermined temperature (high temperature side) in a storage tank of a high temperature heat transfer medium by a heater accommodated therein. The cooling unit 43 can maintain the heat transfer medium at a predetermined temperature (low temperature side) in a storage tank of a low temperature heat transfer medium by an air conditioner accommodated therein. Outlet channels of dual system extend from the heating unit 42 and the cooling unit 43, two outlet channels from each unit, and join with the bypass channels 41a and 41b, respectively.

The heat transfer medium joined at a junction Qa flow through the inlet port 38a into the outer channel 36 shown in FIGS. 2A and 2B, and the heat transfer medium joined at a junction Qb flow through the inlet port 38b into the inner channel 37 shown in FIGS. 2A and 2B. The flow rates of the heat transfer media in the bypass channel 41a and 41b, the heating unit 42 and the cooling unit 43 which flow into the junctions Qa and Qb are controlled by three flow rate control valves 44. Therefore, the temperatures of the heat transfer media flowing into the outer inlet port 38a and the inner inlet port 38b can be controlled independently by changing the flow rate ratio thereof.

Referring to FIG. 3B, there is illustrated a single pump 40. The heat transfer media discharged from the outer outlet port 39a and from the inner outlet port 39b are combined at an O point to be circulated after being boosted by the pump 40. The heat transfer medium boosted by the pump 40 is divided at the branch point P1 into the bypass lines 41a and 41b. Further, each divided heat transfer medium is divided, at branch points P2 provided at the bypass lines, into three parts including the bypass line 41a or 41b, the heating unit 42 and the cooling unit 43.

The configurations of the heating unit 42 and the cooling unit 43 shown in FIG. 3B are the same as those illustrated in FIG. 3A. In addition, as described in FIG. 3A, the temperatures of the heat transfer media flowing into the outer inlet port 38a and the inner inlet port 38b can be controlled independently by adjusting the flow rates of the heat transfer medium of triple system flowing into the junctions Qa and Qb with the use of the three flow rate control valves 44.

By employing the configuration of the collective circulation type illustrated in FIG. 3B, the pump equipment cost or the operation cost can be reduced and, also, the number of measuring points of the heat transfer medium temperature at the outlet port can be decreased.

Figure 4:
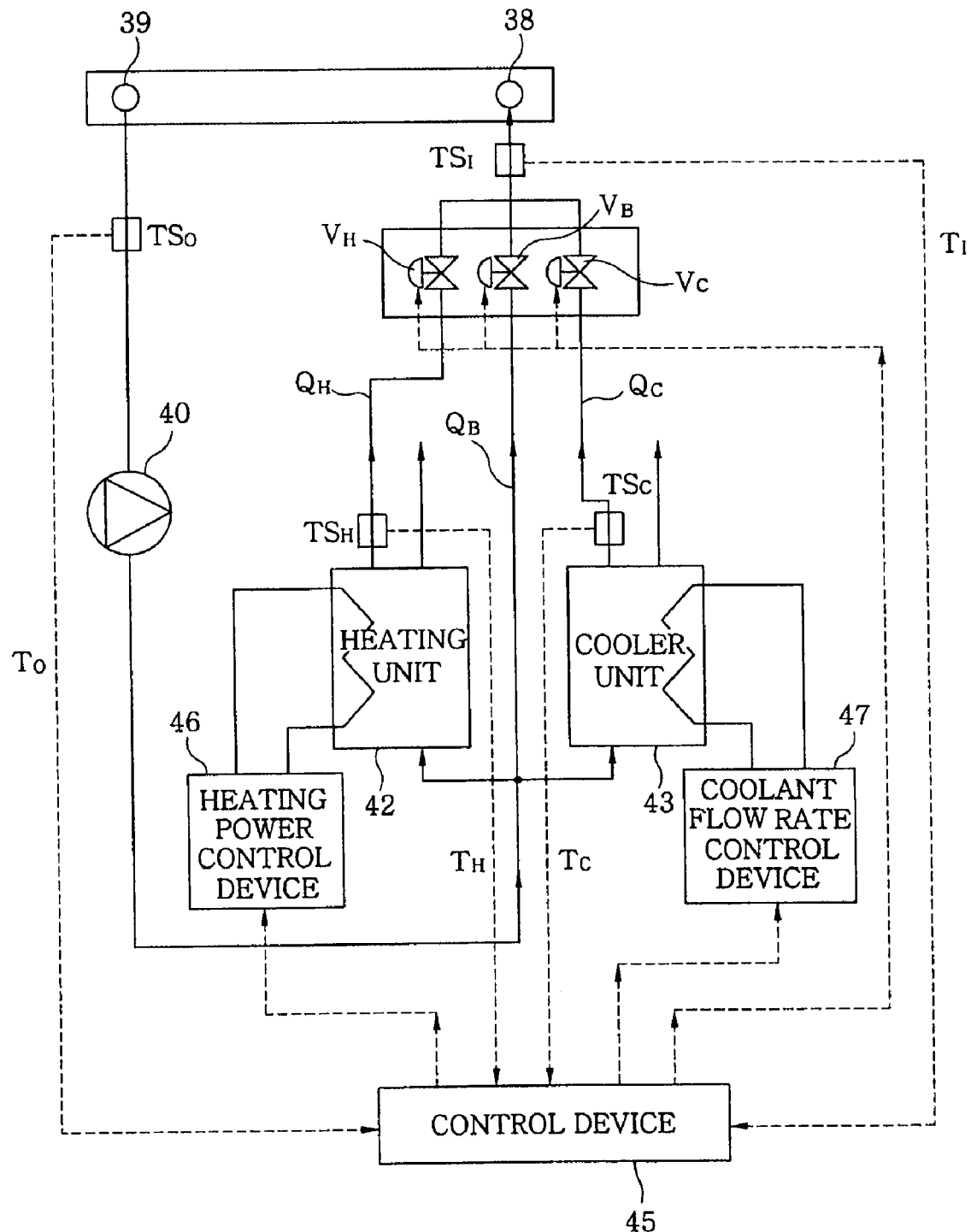
FIG. 4 depicts a configuration example of a temperature control system of the heat transfer medium.

FIG. 4 illustrates a configuration example of the temperature control system of the heat transfer medium. Here, a circulation channel of a single system is shown in order to simplify the description. Thus, the configuration of FIG. 4 is provided for each system. The heating unit 42, the cooling unit 43 and the peripheral devices may be configured as a dual system or may share a single system.

The information needed to perform the temperature control of the heat transfer medium includes a temperature of a circulating heat transfer medium, i.e., an outlet temperature $T_o$ measured by a temperature sensor $TS_O$ provided at the outlet port 39, an inlet temperature $T_I$ measured by a temperature sensor $TS_I$ provided at the inlet port 38, and respective outlet temperatures $T_H$ and $T_C$ of the heating unit 42 and the cooling unit 43, the outlet temperatures $T_H$ and $T_C$ being respectively measured by temperature sensors $TS_H$ and $TS_C$. A target to be controlled is generally the inlet temperature $T_i$ of the inlet port 38. In order to control $T_i$, a bypass flow rate $Q_B$, a heating side flow rate $Q_H$ and a cooling side flow rate $(Q_C)$ need to be controlled to a predetermined ratio. When setting $T_i$ to be greater than $T_O$, $Q_C$ is set to 0, whereas when setting $T_i$ to be smaller than $T_O$, $Q_H$ is set to 0.

In other words, the information on $T_o$, $T_i$, $T_H$ and $T_C$ is inputted to a control device 45, and the values of $Q_B$, $Q_H$ and $Q_C$ (or $Q_B$ and $Q_H$ or $Q_C$) satisfying the target inlet temperature $(T_i^*)$ are calculated, thus controlling the opening degrees of flow rate control valves $(V_B, V_H$ and $V_C)$.

Moreover, in order to control the outlet temperatures $T_H$ and $T_C$ of the heating unit 42 and the cooling unit 43 to predetermined values, respective values obtained from the information on $T_H$ and $T_C$ can be adjusted to match with the target values by controlling a heating power control device 46 and a coolant flow rate control device 47.

Figure 5:
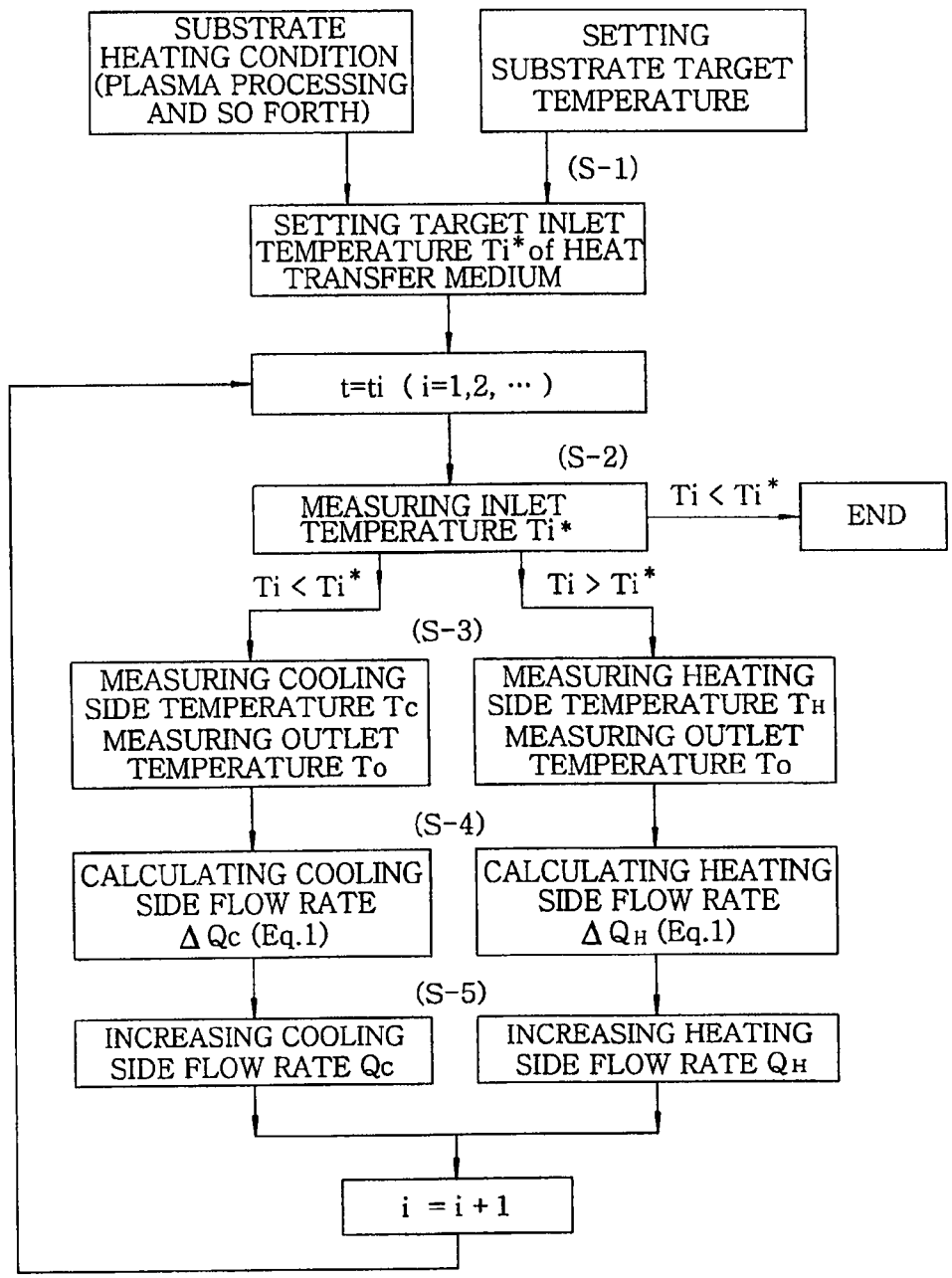
FIG. 5 provides a flowchart showing an example of an operational sequence of a temperature control method in the present invention.
Figure 6:
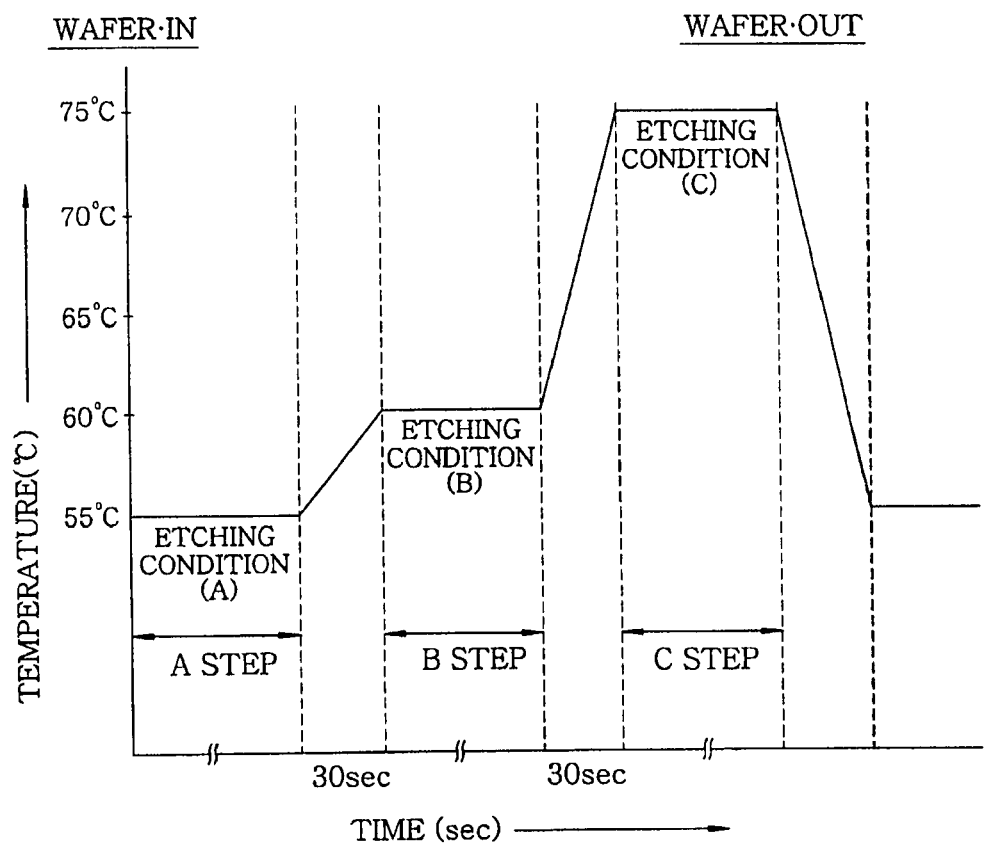
FIG. 6 is a chart diagram illustrating an example of a stepwise temperature control in the plasma processing apparatus.

FIG. 5 provides a flowchart showing an example of an operational sequence of a temperature control method in accordance with the present invention. As can be seen from FIG. 5, first of all, the target inlet temperature $(T_i^*)$ of the heat transfer medium flowing into the susceptor 2 is set based on the substrate heating conditions in the plasma processing and the like, and the substrate target temperature in accordance therewith. At this time, it can be set by experience based on the data of the relationship between the substrate temperature and the inlet temperature $(T_i)$ under the respective heating conditions.

In the present invention, the target inlet temperature $T_i^*$ is set differently depending on the regions of the susceptor 2. In the sequence of the temperature control method described in FIG. 5, the inlet temperature $T_i$ of each region can be independently controlled to the target temperature $T_i^*$ regardless of the inlet temperatures of the other regions. The control sequence in a single system is described in FIG. 5, and the control sequence may be applied to each of the systems in a dual or more system.

First of all, the target inlet temperature $T_i^*$ is set (S-1) as described above. Since the control is sequentially carried out, time t is set to ti (i=1, 2, . . . ), and the inlet temperature $T_i$ at time ti is measured (S-2). When $T_i$ is greater than $T_i^*$, the cooling side flow rate $Q_C$ is increased without changing the heating side flow rate, and the bypass flow rate $Q_B$ is reduced by that amount. The increasing amount $\Delta Q_C$ of the cooling side flow rate is calculated as described below.

When the specific heat of the heat transfer medium is C, the enthalpy variation $\Delta H_i$ of the inlet heat transfer medium by the increase of the cooling side flow rate is calculated by a sum of the sensible heat change $\Delta H_C$ of the cooling side heat transfer medium and the sensible heat change $\Delta H_B$ of the bypass heat transfer medium. That is, $$\Delta H_i = \Delta H_C + \Delta H_B$$
$$= C(\Delta Q_C \cdot T_C - \Delta Q_C \cdot T_B)$$
$$= C \cdot \Delta Q_C (T_C - T_B).$$

$C \cdot \Delta Q_C (T_C - T_B)$ needs to be made same as enthalpy $C \cdot Q_T (T_i^* - T_i)$ that changes the temperature of the medium of total flow rate $Q_T$ ($=Q_B + Q_H + Q_C$) by $(T_i^* - T_i)$. Therefore, $\Delta Q_C$ is obtained by the following Eq. 1:

$$C \cdot \Delta Q_C (T_C - T_B) = C \cdot Q_T (T_i^* - T_i)$$

$$\Delta Q_C = Q_T (T_i^* - T_i) / (T_C - T_B) \qquad \text{Eq. 1}$$

Therefore, the cooling side temperature $T_C$ and the outlet temperature $T_O$ (the bypass temperature $T_B$ is substantially the same as $T_O$) are measured (S-3) and, then, the variation $\Delta Q_C$ of the cooling side flow rate is calculated by using the Eq. 1. Thereafter, based on the calculation result, the cooling side flow rate $Q_C$ and the bypass flow rate $Q_B$ are adjusted by the flow rate control valve (S-5).

Meanwhile, when $T_i^*$ is greater than $T_i$, the heating side flow rate $Q_H$ needs to be increased without changing the cooling side flow rate, and the bypass flow rate $Q_B$ is reduced by that amount. The increasing amount $\Delta Q_H$ of the heating side flow rate is calculated by the following Eq. 2.

$$\Delta Q_C = Q_T (T_i^* - T_i) / (T_H - T_B) \qquad \text{Eq. 2}$$

In this case as well, the sequences of S-1 to S-5 are same.

Next, i is set to i+1, and the control is performed and completed when $T_i$ becomes $T_i^*$. When there are provided a plurality of systems, the above operations are carried out for each system.

In accordance with the above-described operational sequence, the heating side flow rate or the cooling side flow rate may be increased or decreased by the desired amount of enthalpy variation. Accordingly, the control operation becomes simple, and the energy input into the heating unit or removed from the cooling unit can be decreased, which is desirable in view of energy efficiency.

While the invention has been shown and described with respect to the embodiments, it will be understood by those skilled in the art that various changes and modification may be made without departing from the scope of the invention as defined in the following claims.

What is claimed is:

1. A temperature control device for a target substrate comprising:
   a mounting table having temperature control members respectively provided in temperature control systems to control temperatures of regions of the target substrate to respective predetermined temperature levels;
   circulation channels, respectively provided in the temperature control systems, through which fluids passing through the temperature control members flow;
   heating channels each for flowing therein a heated fluid having a higher temperature compared to the fluids circulating in the circulation channels;
   cooling channels each for flowing therein a cooled fluid having a lower temperature compared to the fluids circulating in the circulation channels; and
   joining units that join the circulation channels, the heating channels and the cooling channels near the mounting table, to build the respective temperature control systems, the joining units having flow rate control units that control flow rate ratios of the fluids supplied from the respective channels to the temperature control members.

2. The temperature control device for a target substrate of claim 1, wherein each temperature system has a pump for sucking a fluid of a downstream side of each temperature control member and discharging the sucked fluid to its corresponding circulation channel, heating channel and cooling channel.

3. The temperature control device for a target substrate of claim 1, wherein the flow rate control units feedback-control temperatures detected by temperature detection units, which detect temperatures of fluids flowing from the joining units to the temperature control members, to obtain predetermined temperature levels.

4. The temperature control device for a target substrate of claim 2, wherein the flow rate control units feedback-control temperatures detected by temperature detection units, which detect temperatures of fluids flowing from the joining units to the temperature control members, to obtain the predetermined temperature levels 5. A temperature control device for a target substrate comprising:
   a mounting table having temperature control members respectively provided in temperature control systems to control temperatures of regions of the target substrate to respective predetermined temperature levels;
   circulation channels, respectively provided in the temperature control systems, through which fluids passing through the temperature control members flow;
   heating channels each for flowing a heated fluid having a higher temperature compared to the fluids flowing in the circulation channels;
   cooling channels each for flowing a cooled fluid having a lower temperature compared to the fluids flowing in the circulation channels;
   first joining units that join the circulation channels, the heating channels and the cooling channels near the mounting table, to build the respective temperature control systems, the first joining units having flow rate control units that control flow rate ratios of the fluids supplied from the respective channels to the temperature control members;
   a second joining unit, provided at a downstream side of the temperature control members, for joining the fluids provided from the temperature control members; and a pump for sucking the joined fluids from the second joining unit and discharging the sucked fluid to the circulation channels, the heating channels and the cooling channels.

6. The temperature control device for a target substrate of claim 5, wherein the second joining unit and the pump are formed as a single unit with the pump.

7. The temperature control device for a target substrate of claim 5, wherein the flow rate control units feedback-control temperatures detected by temperature detection units, which detect temperatures of the fluids flowing from the first joining units to the temperature control members, to obtain the predetermined temperature level.

8. The temperature control device for a target substrate of claim 6, wherein the flow rate control units feedback-control temperatures detected by temperature detection units, which detect temperatures of the fluids flowing from the first joining units to the temperature control members, to obtain the predetermined temperature level.

9. A temperature control method for controlling temperatures of regions of a target substrate mounted on a mounting table to predetermined temperature levels, comprising:
providing in the mounting table temperature control members for controlling the temperatures of the regions of the target substrate, the temperature control members being provided for respective temperature systems;
calculating a difference between a temperature of a fluid flowing in each temperature control member and a target temperature thereof;
on a temperature system basis, joining, before the fluid flows to the each temperature control member, the fluid flowing each temperature control member and one or both of a heated fluid and a cooled fluid and controlling a flow rate ratio between the fluid and the heated fluid and/or the cooled fluid; and
controlling the temperature of the fluid flowing in each temperature control member, wherein the fluids are joined and then inputted into corresponding temperature control members and the heated and the cooled fluid have a higher and a lower temperature than the inputted fluids.

10. The temperature control method for a target substrate of claim 7, wherein the flow rate ratio is controlled by performing feedback-control to make a detected temperature of the fluid flowing into the corresponding temperature control members equal to a target temperature.

11. A plasma processing apparatus including the temperature control device described in claim 1.

12. A plasma processing apparatus including the temperature control device described in claim 5.

* * * * *